O. VANORMAN.
Carpet-Stretchers.
No. 137,739. Patented April 8, 1873.
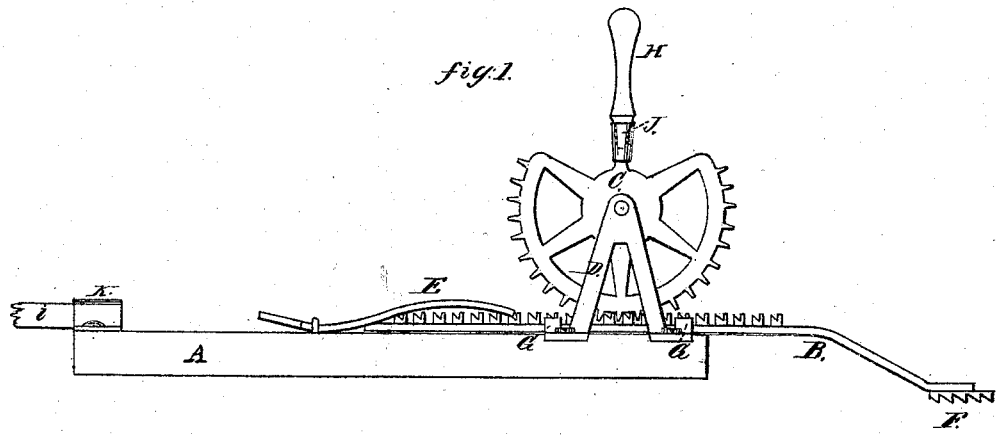
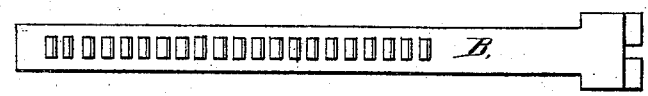
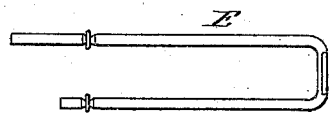
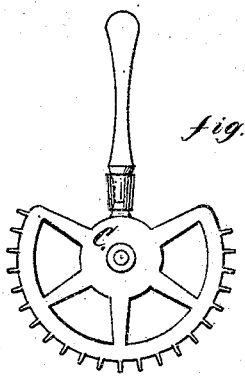
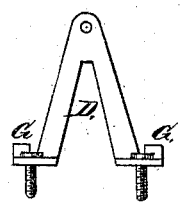
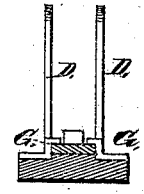
Witnesses:
O. Bowe
M. H. Bodine
Inventor:
Oliver Vanorman

UNITED STATES PATENT OFFICE.

OLIVER VANORMAN, OF FOND DU LAC, WISCONSIN.

IMPROVEMENT IN CARPET-STRETCHERS.

Specification forming part of Letters Patent No. 137,739, dated April 8, 1873; application filed February 26, 1873.

*To all whom it may concern:*

Be it known that I, OLIVER VANORMAN, of the city and county of Fond du Lac and State of Wisconsin, have invented certain Improvements in Carpet-Stretchers, of which the following is a specification:

Nature and Object of the Invention.

My invention relates to the combination of a bed-piece, together with a movable slide with cogs upon the upper side and teeth riveted upon the under side of the front end; also, a ratchet-wheel with standards to support said ratchet; and, further, a dog to hold the said slide from moving back when not required; also, a loop or socket to hold an extra slat or handle to lengthen as required.

Description of Drawing.

Figure 1 is a side view of my invention complete. Fig. 2 shows the movable slide, top view. Fig. 3 is a side view of the teeth in sections. Fig. 4 is an end view of section of teeth. Fig. 5 shows the form of the dog. Fig. 6 shows the ratchet-wheel with socket for handle. Fig. 7 is a side view of standard to hold ratchet. Fig. 8 is an end view of standards, showing the stops or guides to hold the movable slides in place.

General Description.

A is the bed-piece—should be about twenty inches long, three inches wide, and one inch thick. B is the movable slide with cogs on the upper side; also sections of teeth fastened, by means of screws or rivets, on the under side of the front end. C is the ratchet-wheel, with cogs upon the outer edge to match the cogs on said slide B, for the purpose of moving said slide back and forth. D is the standards to support the said ratchet C. E is the dog to hold the slide in place when in use. F is the teeth, made in sections and fastened to the under side of said slide B. G is the projection on the inside of standards, operating as guides for the said slide B. H is the handle, fastened into the socket J, shown in Figs. 1 and 6 in the drawing, of the ratchet. I is the extra bar or slat for lengthening the stretcher to the required length, and is fastened to the stretcher by fitting one end into the socket K.

To use my invention, have the extra bar or slat I of the required length to reach across the room when fitted into said socket K, placing the handle of the ratchet forward; then place the teeth on the slide B upon the edge of the carpet; then move the handle of the ratchet backward, thus lengthening the slide B, which stretches the carpet, and the dog E holds the said slide in place until nailed, when pressing down on the back end of the dog raises the front end away from the cogs on the said slide, and allows the same to be moved backward as required.

Claim.

I claim as my invention—

The combination of the bed-piece A, the movable slide B with sectional teeth F, the ratchet C, together with the standard D and dog E, also the extra bar or slat $i$, as and for the purposes specified.

OLIVER VANORMAN.

Witnesses:
O. P. BOWE,
W. H. BODINE.